April 30, 1968    L. J. CARVER    3,380,730
WORKPIECE CLAMPING DEVICES
Filed April 11, 1966    5 Sheets-Sheet 1

Inventor
Leonard John Carver
By

April 30, 1968 L. J. CARVER 3,380,730
WORKPIECE CLAMPING DEVICES
Filed April 11, 1966 5 Sheets-Sheet 2
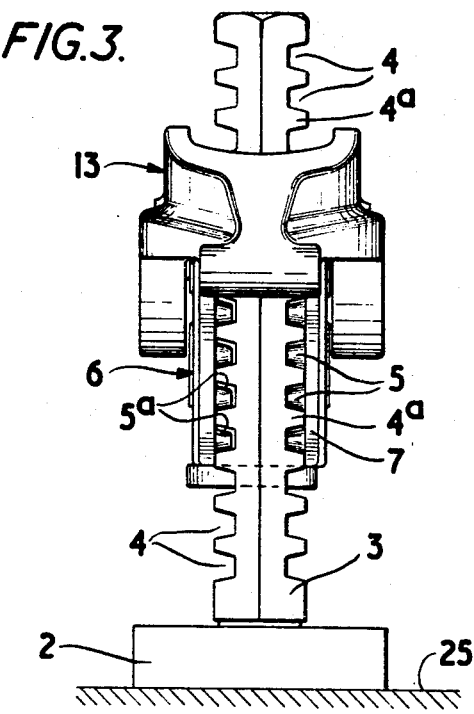
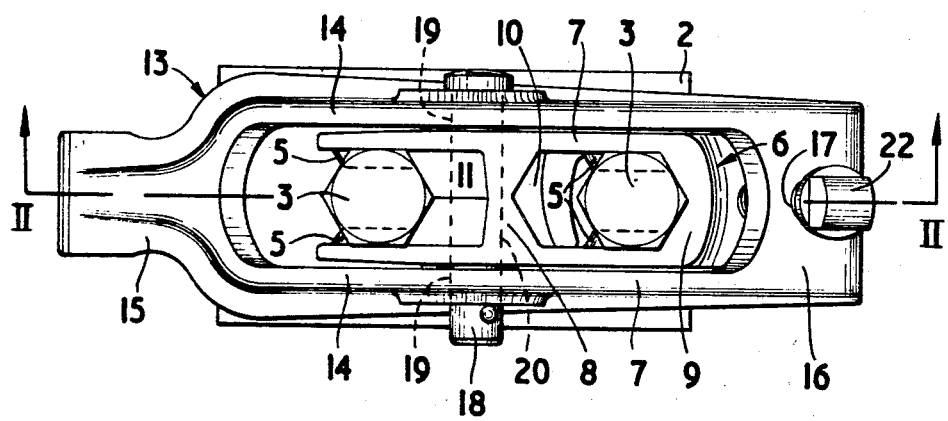
Inventor
Leonard John Carver
By

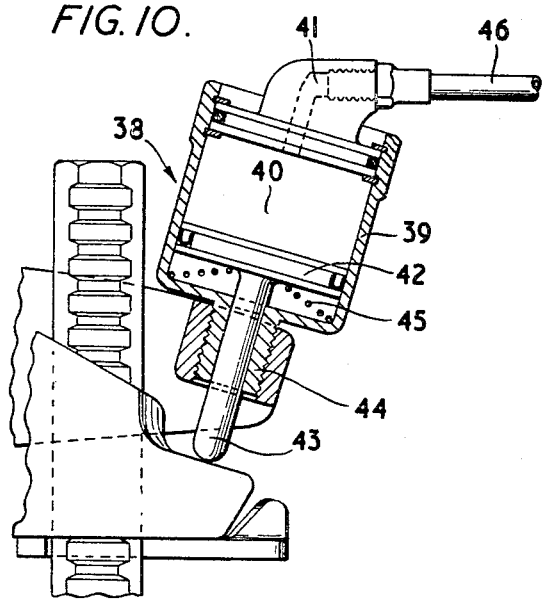

3,380,730
WORKPIECE CLAMPING DEVICES
Leonard John Carver, Walsall, England, assignor to Carver & Co. (Engineers) Limited, Walsall, England, a British company
Filed Apr. 11, 1966, Ser. No. 541,560
Claims priority, application Great Britain, Apr. 15, 1965, 16,379/65
6 Claims. (Cl. 269—25)

The invention relates to a workpiece clamping device.

A conventional method of clamping workpieces to machine tables during short production runs or non-repetition work is the so-called "gland-fixing" method involving the use of separate studs, packing blocks, and bridge bars or so-called bridge "glands." In this conventional method, the packing blocks are built upon the machine table to the workpiece height and a bar forming a bridge "gland" is laid across a gap between the blocks and the workpiece, so that one end of the "gland" bears on the blocks and the other on the workpiece. Clamping pressure is then applied to the mid-span of the "gland" by turning a nut on a stud passing down through the gland and the gap and engaged with a T-nut slidingly interlocked with a T-sectioned slot in the machine table. In this arrangement, the stud acts as a tension member and the blocks act as means in compression. One disadvantage of this known method is that the packing blocks tend to become unstable in use if built up to a height of over about 3 or 4 inches. Another disadvantage is that each clamping station uses loose parts which collapse, or tend to collapse, as soon as the work piece is freed. Each such clamping station may have, a part from a T-nut and a stud, four or more separate parts, namely a top nut, a "gland" bar, and two or more packing blocks. A third disadvantage is that, because the stud has to engage a T-slot, convenience in arrangement of a clamping station relatively to a workpiece on the table will be determined by the T-slot arrangement in the said table.

An object of the present invention is to provide a clamping device which, while retaining a desirable feature of the conventional method described above, namely the feature of the provision of tension and compression members, at the same time avoids at least the first and second of the above-mentioned disadvantages.

According to the invention, a work-piece clamping device comprises a base, upstanding support means formed by a pair of spaced uprights or columns on said base and carrier means formed by a carrier member, said carrier means being supportable on said support means, whereby to be adjustable for height relatively to the base, by teeth or projections provided on the one said means and slidingly engageable with notches or openings provided in the other said means, the carrier member carrying a pivoted clamping jaw, pivoted for up and down angular movement about an axis transverse to the direction in which the uprights or columns are spaced, for clamping the workpiece, and the carrier member being bodily movable relatively to the uprights or columns to slidingly disengage the teeth or projections from the notches or openings to enable the carrier member to be moved from one height-adjusted position to another.

The spaced uprights or columns may have vertically-spaced height-adjustment notches slidingly selectively engageable by teeth provided on the carrier member, and slidingly disengageable from said teeth by moving the carrier member bodily in the direction in which the uprights or columns are spaced apart. The carrier member may have a locking lever movable to bring a part of said locking lever into a position in which said part acts as a stop co-operating with one of the uprights or columns to prevent movement of the carrier member to disengage the said teeth from the notches. The clamping jaw may be operable by a screw engaged with a screw-threaded hole in the said jaw and adapted to bear upon a tail portion of the carrier member. Or, the clamping device may carry a fluid-pressure operable actuator for operating the clamping jaw. The carrier member, with the jaw carried thereby, may be removable from the uprights or columns and replaceable thereon in an inverted position to provide jacking means. If desired, with a view to avoiding the third disadvantage mentioned above in connection with the conventional "gland-fixing" method, the improved device may have in combination therewith one or more fixing blocks for securing the said device to a work table or work bed, said fixing blocks being connectable to the work table or bed by fastening means, and said fixing block or blocks having, or each having, an over-hanging lip for projecting and retaining the base of the clamping device.

FIGURE 1 of the accompanying drawings shows, by way of example, and in side elevation, a workpiece clamping device constructed in accordance with the present invention, a carrier member of the said device being shown in a locked height-adjusted position.

FIGURES 3 and 4 are, respectively, front end and plan views of the device shown in FIGURE 1.

FIGURE 10 illustrates a modification.

Figure 1:
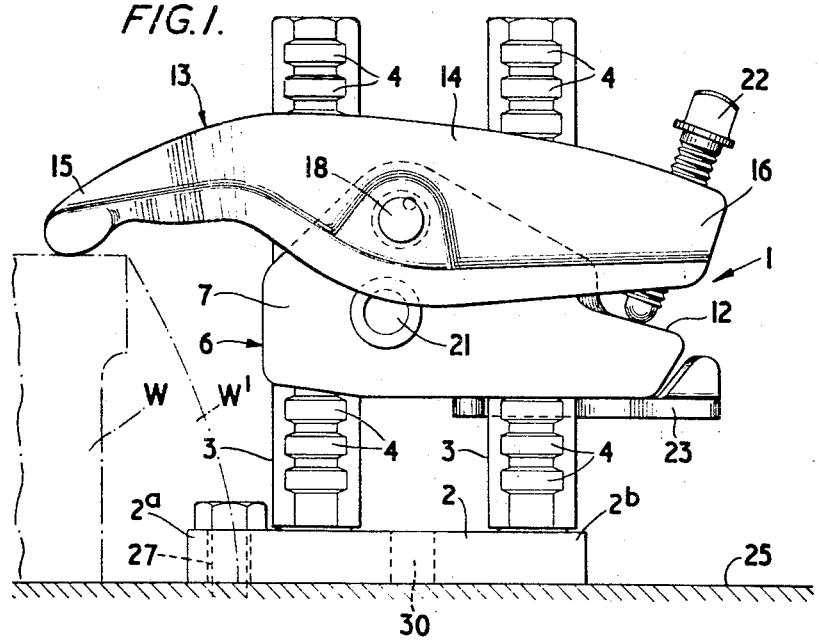
Figure 2:
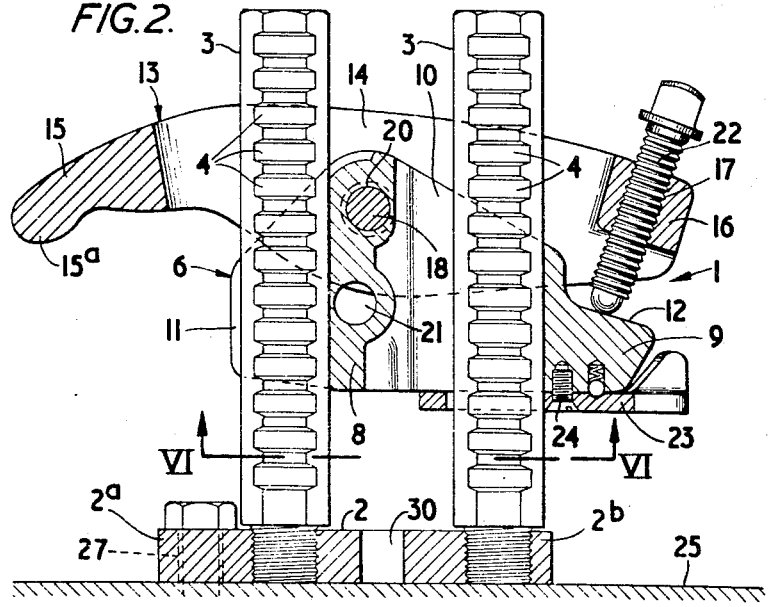
FIGURE 2 is a sectional view of the device shown in FIGURE 1.
Figure 5:
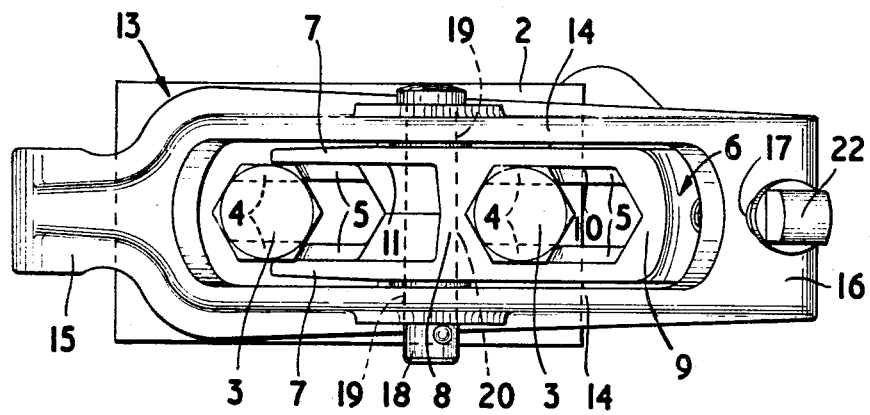
FIGURE 5 is a plan view corresponding to FIGURE 4, but showing the carrier member of the device in an unlocked and bodily-displaced position in which teeth on the carrier member are free of notches in uprights of the device to enable the carrier member to be moved vertically to a new height-adjusted position.
Figure 6:
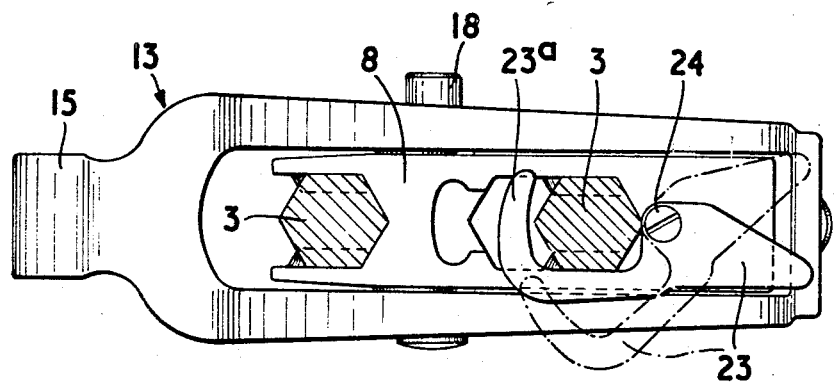
FIGURE 6 is a sectional view on the line VI—VI, FIGURE 2.

Referring to FIGURES 1 to 7 of the drawings, a workpiece clamping device 1 comprises a metal base 2 provided with a pair of spaced front and rear uprights 3 of solid metal which are permanently attached to said base 2 and which are each provided, at each of two opposite sides, with a row of vertically-spaced, elongated, horizontal open-ended notches 4 extending in the same direction as that in which the uprights 3 are spaced apart. Supported on the uprights 3, by means of teeth 5 selectively slidingly engaged with the notches 4, is a metal carrier member 6 of a hollow box form having spaced vertical side walls 7 connected by two integral spacer portions 8, 9, spaced one behind the other, there being left between said spacer portions a large opening 10 for accepting the rear upright 3, and there being left, forwards of the front spacer portion 8, a forwardly-presented channel 11 for accepting the front upright 3. The carrier member 6 slopes downwards at the top towards the front and rear of the said member 6, and the rear extremity or tail of the carrier has an upwardly-presented surface 12. The carrier member 6 carries a metal clamping jaw 13 for clamping the workpiece (shown diagrammatically at W in FIGURE 1), said jaw 13 having a pair of spaced vertical side walls 14 which are parallel to, and embrace, the side walls 7 of the carrier member, these jaw walls 14 being connected by integral front and rear end portions 15, 16 of the jaw. The front end portion 15 of the jaw 13 terminates in a tip 15a for engaging the work; whilst the rear end portion 16 of the jaw 13 has an internally screw-threaded hole 17 therein. The jaw 13 is pivotally connected to the carrier member 6, for angular up and down movement about a horizontal axis transverse to the direction in which the uprights 3 are spaced apart, by a pivot pin 18 engaged through aligned holes 19 in the jaw 13 and through a transverse hole 20 in the carrier member 6, the latter hole passing through the front spacer portion 8 of said member. A second transverse hole (shown at 21) is provided in the carrier member, to provide an alternative and lower, position, for the pivot pin 18. The clamping jaw 13 is operated by a screw 22 engaged with the threaded hole 17 in the rear end of the jaw 13, the outer end of this screw 22 being held, by the weight of the jaw, against the surface of the tail of the carrier member.

Figure 7:
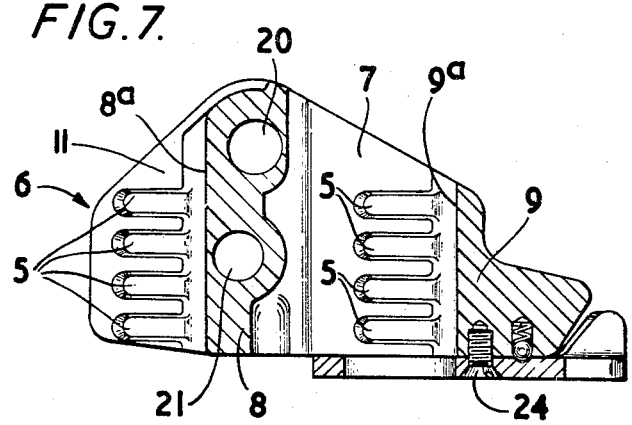
FIGURE 7 is a sectional view showing the carrier member only.

The aforesaid teeth 5 engaged with the notches 4 are of elongated rib-like form and are horizontally disposed, and are arranged in four groups, one group to each row of notches 4, the teeth 5 being integral with the respective side walls 7 of the carrier member 6 and projecting from the inside faces of said walls 7. FIGURE 7 shows one side wall 7 provided with two of the four groups of teeth 5, the other two groups of said teeth being provided in a similar way on the other side wall 7 of the carrier member. The rear end portions of the teeth 5 of the two front groups are integral with a front surface 8a (FIGURE 7) of the front spacer portion 8, whilst the rear end portions of the teeth 5 of the two rear groups are integral with a front surface 9a (FIGURE 7) of the rear spacer portion 9. The teeth 5 of each group are vertically spaced from each other, and there may, for example, be four teeth 5 to each group, as in the case of the embodiment shown. The carrier member 6 is arranged to be bodily movable rearwards in the direction in which the uprights 3 are spaced apart, to cause the teeth 5 to slidingly disengage from the notches 4 (the aforesaid opening 10 and channel 11 in the carrier member 6 being dimensioned to permit such movement) and the said carrier member 6 is adjustable for height relatively to the base by bodily moving the carrier member 6 rearwards to the position shown in FIGURE 5 to disengage the teeth 5 from the notches 4, then moving the carrier member 6 up or down to the desired new height-adjusted position, and then bodily moving the carrier member 6 forwards to slidingly engage the teeth 5 with the selected notches 4 corresponding to the new height-adjusted position. The underside of the carrier member 6 is provided with a hook-ended pivoted locking lever 23 pivoted at 24 to the rear spacer portion 9 and movable in a horizontal plane from an out-of-use position (shown in dot-and-dash lines in FIGURE 6) in which the lever lies clear of the opening 10, to an operative position (shown in full lines in FIGURE 6) in which the hook-end (shown at 23a) of the lever extends between the uprights 3 to form a stop co-operating with the rear upright 3 to prevent rearward movement of the carrier member 6 to disengage the teeth 5 from the notches 4.

Figure 8:
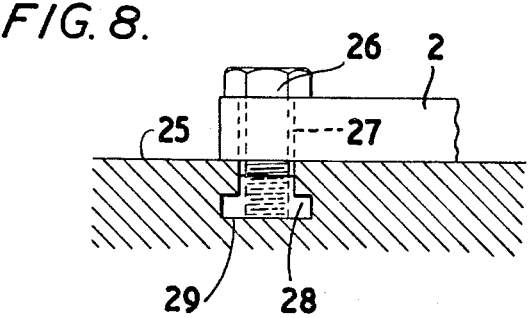
FIGURES 8 and 9 show two different ways of securing the device to the work table or bed.

In a convenient method of use of the above device, the workpiece W is first positioned on the work table or bed (shown at 25), the said clamping device 1 is brought into a suitable position relative to the workpiece, and the base 2 of the clamping device is secured to the table or bed 25 by a bolt or screw 26 (FIGURE 8) which is passed through a fixing hole 27 or 30 in that end of the base nearest the workpiece and engaged with a T-nut 28 in turn engaged with a convenient T-slot 29 in the said table or bed. When the base 2 has been secured in place, the carrier member 6 is adjusted for height as necessary, in the manner above described, and when adjusted the said carrier member 6 is locked, against rearward disengaging movement, by means of the pivoted lever 23. The operating screw 22 for the clamping jaw 13 is then turned, in the appropriate direction, by applying normal spanner pressure to a head thereof, to result in an approximately equal pressure being applied through the jaw tip 15a to the workpiece.

In the embodiment illustrated, the front end, shown at 2a, of the base 2 projects beyond the front upright 3 to an extent greater than the extent to which the rear end, shown at 2b, of the said base projects beyond the rear upright 3. If the workpiece W projects outwards (for example, as shown by the dotted line W' in FIGURE 1) to such an extent that the jaw end 15 could not engage the workpiece if the base end 2a were nearest the workpiece the carrier member 6, with the jaw 13, can be lifted off the uprights 3, the base next turned horizontally through 180° to bring the end 2b nearest to the work, and the carrier member 6, with the jaw 13, then replaced on the uprights so that the jaw end 15 now projects beyond the base end 2b, thereby increasing the distance by which the jaw projects beyond the base 2. It is desirable that the bolt or screw 26 be engaged with the hole in the base which is nearest to the workpiece, so that in the arrangement shown in FIGURE 1, it is desirable that the bolt or screw 26 engages the hole 27, while in the reversed arrangement described above, with the end 2b nearest to the work, it is desirable that the bolt or screw 26 engages the hole 30.

As in the latter case the reactive load on the bolt or screw is greater, it is preferable that the fastening means engaged with the hole 30 be a high-tensile bolt or Allen screw.

If desired, the base 2 may be provided with internally screw-threaded holes in addition to, or instead of, the holes 27, 30, said screw-threaded holes being engageable by upstanding screw-threaded shanks of T-bolts provided instead of the T-nuts and having heads slidingly interlockable with the T-slots for the purpose of securing the base to the work table or bed.

Figure 9:
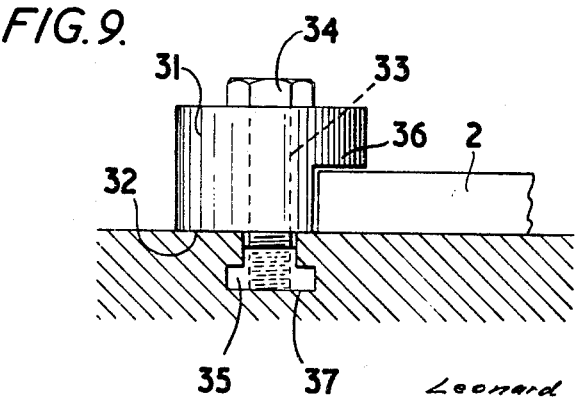

If the relationship of the workpiece to T-slots in the work table or bed is such as to render it inconvenient to secure the base 2 of the device by a fastening member engaged into a fixing hole in said base, a modified method of holding down the clamping device may be used. In this modification, illustrated in FIGURE 9, the clamping device 1 is in combination with one or more metal fixing blocks, such as that shown at 31. The, or each, of said fixing blocks has a flat underside face base 32 and is vertically-apertured at 33 to receive a bolt 34. The, or each, fixing block has one side undercut to provide the block with an integral overhanging lip 36 for projecting over an edge of, and retaining, the base 2 of the clamping device. In use, in this modification, the fixing block, or each fixing block, can be secured to the table or bed by passing the bolt 34 through the hole 33 and engaging it with a T-nut 35 in turn engaged with a suitable T-slot 37 in the table or bed, and the base 2 of the clamping device held in position, in any suitable orientation, on the table or bed 2 by engaging the overhanging lip 36 of the, or each, fixing block over the said base. At the completion of a machining operation on a workpiece clamped by the clamping device, the entire clamping device 1 can, without losing the height adjustment, be withdrawn by sliding the base 2 out from engagement with the fixing block or blocks, and the workpiece may be changed and another reclamped with minimum delay. This provides for considerable time saving in initial setting-up and in repeat operations.

When the clamping device is in use the front upright 3 that is, that nearest to the workpiece, acts in effect as a tension member and the rear upright 3 acts, in effect as a compression member.

The metal, shown at 4a, between the notches 4 forms teeth slidingly engageable with the openings, shown at 5a, between the teeth 5 on the carrier member, as illustrated in FIGURE 3, so that in the embodiment shown, the carrier member can be regarded as having teeth slidingly engageable with notches in the uprights 3, and the uprights 3 can be regarded as having teeth slidingly engageable with openings in the said carrier member 6.

If desired, stop parts may be provided at the top of the uprights to prevent less than the full number of teeth in each group from being engaged with the respective row of notches.

The notch spacing may be such that the height of the carrier member is adjustable by ½ inch increments.

Conveniently there may be provided a series of units, each comprising a base provided with two uprights and exchangeable with the base and uprights assembly of the above described device to provide different upright heights according to requirements. For example, a series of units having uprights progressively increasing in height by 3 or 6 inch increments may be provided. The uprights may be of any suitable height, all loading in the uprights being purely compressive and tensional.

The clamping jaw may be available in various forms to provide various work-holding facilities. For example, it may be forked to hold two relatively small workpiece simultaneously, or have a rod-like extension for engaging in side holes in castings, or have a shallow-profiled end designed for engaging in undercuts in workpieces. Where the height of the uprights permits, the arrangement may be such that the entire carrier member and jaw may be completely removed from the uprights and replaced thereon in an inverted position, whereby rotation of the jaw-operating screw can cause the front end of the jaw to move in an upward direction to produce a jacking action of considerable power and convenience and of considerable value to an operator when setting up an irregularly shaped article on the machine table or bed. In this case, with the jaw used in an inverted position, it is desirable that the fastening means, for securing the base 2 to the work table or bed, are located either at the middle of the base 2 or at that end of the base 2 which is furthest away from the workpiece.

If desired, fastening means for securing the case 2 to the work table or bed may be engaged with holes (if provided) in the latter instead of with T-slots. Or the base may be mounted on a suitable part other than a work table or work bed.

The base of the device, may, if required, be provided at opposite sides with longitudinal lips or flanges slidingly endwise engageable with a T-slot in a part to which the device is to be secured, whereby the said lips or flanges, when engaged with said T-slot, retain the device against upward displacement.

If desired, instead of the jaw 13 being operated by a screw 22, it may be operated by fluid-pressure means. Thus, FIGURE 10 illustrates a modification (incorporating fluid-pressure means) of the device shown in FIGURES 1 to 7. In this modification, the tail end of the clamping jaw carries a hydraulic actuator 38 comprising a cylinder 39 supplied with oil 40 through an inlet 41 receiving a pipe 46 leading from a central hydraulic power source (not shown). A piston 42 is slidably mounted in the cylinder 39. This piston 42 has a stem 43 slidably engaged through a spigot 44 at the base of the cylinder 39, and the arrangement is such that the jaw can be moved into clamping engagement with the workpiece by causing fluid-pressure to be transmitted from the hydraulic power source, through the pipe 41 to the oil in the cylinder, so that the piston 42 is forced down and the stem 43 presses against the tail end of the carrier member, thereby lifting the tail end of the clamping jaw and moving down the clamping end of the said jaw. A coiled return spring 4 returns the piston upwards when the pressure is reduced. The spigot 44 is screw-threaded to engage a thread in the jaw, and the inlet 41 is swivelly mounted on the cylinder 39, to enable the pipe 46 to be moved out of the way of the clamping device and to facilitate screwing-in of the spigot 44. A number of the above described modified clamping devices, each having a hydraulic actuator 38, may be arranged to be operated from a single hydraulic power source, if desired.

I claim:

1. A clamping device comprising: a base; upstanding support means formed by a pair of spaced uprights on said base; carrier means formed by a carrier member, said carrier means being supportable on said upstanding support means, whereby to be adjustable for height relatively to the base, by projections provided on the one said means and slidingly engageable with openings provided in the other said means; and, for clamping the work-piece, a pivoted clamping jaw carried by the carrier member, said jaw being pivoted for up and down angular movement about an axis transverse to the direction in which the uprights are spaced, and the carrier member being bodily movable relatively to the uprights to slidingly disengage the projections from the openings to enable the carrier member to be moved from one height-adjusted position to another.

2. A clamping device, according to claim 1, wherein the said openings comprise vertically-spaced height-adjustment notches on said spaced uprights, and wherein said projections comprise teeth provided on the carrier member slidingly selectively-engageable in said notches and slidingly disengageable from said notches by moving the carrier member bodily in the direction in which the uprights are spaced apart.

3. A clamping device, according to claim 1, wherein the carrier member has a locking lever movable to bring a part of said locking lever into a position in which said part acts as a stop co-operating with one of the uprights to prevent movement of the carrier member to disengage the projections from the openings.

4. A clamping device, according to claim 1, wherein the clamping jaw is operable by a screw engaged with a screw-threaded hole in said jaw, and adapted to bear upon a tail portion of the carrier member.

5. A clamping device, according to claim 1, wherein the said device carries a fluid-pressure operable actuator for operating the clamping jaw, said fluid-pressure operable actuator comprising: a cylinder carried by a tail end of the clamping jaw; and a fluid-pressure operable piston housed in said cylinder and having a stem operatively engaged with a tail portion of the carrier member.

6. A clamping device, according to claim 1, in combination with at least one fixing block for securing the said device to a work support, said fixing block being connectable to said work support by fastening means, and said fixing block having an overhanging lip for projecting over, and retaining, the base of the clamping device.

References Cited

UNITED STATES PATENTS

| | | | |
|---|---|---|---|
| 140,852 | 7/1873 | Sinclair | 269—238 X |
| 162,866 | 5/1875 | Squire | 269—94 |
| 1,490,063 | 4/1924 | Tower | 269—238 X |
| 2,314,788 | 3/1943 | Innes | 269—238 X |
| 3,281,140 | 10/1966 | Smierciak. | |
| 3,331,111 | 7/1967 | Carver | 269—171 X |

HAROLD D. WHITEHEAD, *Primary Examiner.*

J. F. McKEOWN, *Assistant Examiner.*